US008781488B2

(12) United States Patent
Brunel et al.

(10) Patent No.: US 8,781,488 B2
(45) Date of Patent: Jul. 15, 2014

(54) METHOD AND AN APPARATUS FOR ENABLING AT LEAST ONE MOBILE TERMINAL TO TRANSFER AND/OR RECEIVE DATA THROUGH MULTIPLE FREQUENCY BANDS

(75) Inventors: Loic Brunel, Rennes Cedex (FR); Nicolas Gresset, Rennes Cedex (FR); Mourad Khanfouci, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 242 days.

(21) Appl. No.: 13/411,888

(22) Filed: Mar. 5, 2012

(65) Prior Publication Data

US 2012/0238308 A1    Sep. 20, 2012

(30) Foreign Application Priority Data

Mar. 14, 2011  (EP) ..................................... 11158005

(51) Int. Cl.
*H04W 72/04* (2009.01)

(52) U.S. Cl.
USPC ......... 455/452.1; 455/509; 455/453; 455/515

(58) Field of Classification Search
USPC ........... 455/452.1, 509, 517, 422.1, 450, 500, 455/453, 434, 515, 67.11
See application file for complete search history.

(56) References Cited

U.S. PATENT DOCUMENTS

| | | | |
|---|---|---|---|
| 2010/0173637 A1 | 7/2010 | Damnjanovic et al. | |
| 2010/0285809 A1 | 11/2010 | Lindstrom et al. | |
| 2011/0159867 A1* | 6/2011 | Kuo | 455/422.1 |
| 2012/0099452 A1* | 4/2012 | Dai et al. | 370/252 |
| 2013/0337823 A1* | 12/2013 | Tiirola et al. | 455/452.2 |

FOREIGN PATENT DOCUMENTS

WO    WO 2010/126418 A1    11/2010

OTHER PUBLICATIONS

"Support of wider bandwidth for Home eNodeB in LTE-Advanced", Alcatel-Lucent Shanghai Bell, Alcatel-Lucent, 3GPP TSG-RAN WG1 #56, R1-090769, XP050318629, Feb. 9-13, 2009, 7 pages.
European Search Report issued Jul. 19, 2011, in European Patent Application No. 11158005.6, filed Mar. 14, 2011.

* cited by examiner

*Primary Examiner* — John J Lee
(74) *Attorney, Agent, or Firm* — Oblon, Spivak, McClelland, Maier & Neustadt, L.L.P.

(57) ABSTRACT

A telecommunication network includes a telecommunication device and one or more mobile terminals that communicate data over multiple frequency bands. The telecommunication device obtains the carrier aggregation capability of the mobile terminals, as well as its own coordinated carrier aggregation capability. The telecommunication device then transfers this information to a centralizing device, as well as information related to a neighboring telecommunication device. The centralizing device then responds with a frequency band to be used by the telecommunication device for communication with the mobile terminals, as well as control signaling through the frequency band.

14 Claims, 6 Drawing Sheets

METHOD AND AN APPARATUS FOR ENABLING AT LEAST ONE MOBILE TERMINAL TO TRANSFER AND/OR RECEIVE DATA THROUGH MULTIPLE FREQUENCY BANDS

The present invention relates generally to a method and an apparatus for enabling, in a wireless cellular telecommunication network, at least one mobile terminal to transfer and/or receive data through multiple frequency bands.

Wireless cellular telecommunication networks are largely deployed but there are still some areas not covered by the base stations of the wireless cellular telecommunication network. The base stations are deployed by an operator according to a given planning.

For example, the access to the wireless cellular telecommunication network might not be possible or might require a too high transmission power or a too low spectral efficiency, i.e., too many system resources for a mobile terminal located in a building, if the signals radiated by the base stations and/or by the mobile terminal are too attenuated.

Solutions are proposed today. Particular base stations which are not necessarily deployed by the operator and thus not following a given planning, like femto base stations or pico base stations or relays named hereinafter home base stations, are largely deployed and may provide coverage areas within the buildings and base station offload. Relays may also provide outdoor coverage extension.

The home base stations may enable a limited number of mobile terminals to access the wireless cellular telecommunication network through their respective resources. The mobile terminals allowed to access the resources of the network through a home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and his family can access the wireless cellular telecommunication network through the home base station. These mobile terminals are associated with the home base station.

Home base stations and base stations are named hereinafter telecommunication devices.

The resources, like frequency bands, allocated to a telecommunication device for communicating with mobile terminals may be, during certain periods of time, unused or partially used as far as no or few allowed mobile terminals are located in the area covered by the telecommunication device.

Such situation reduces the overall performance of the wireless cellular telecommunication network as far as unused resources could be helpful for other telecommunication devices and other mobile terminals.

Home base stations generally have limited performances in comparison with base stations. For example base stations may have the capability to transfer or receive signals on plural frequency bands simultaneously and home base stations may have the capability to transfer or receive signals simultaneously on a limited amount of frequency bands.

New generations of mobile terminals enable certain mobile terminals to transfer or receive signals on plural frequency bands simultaneously.

BACKGROUND

The present invention aims at increasing the use of the resources allocated to telecommunication devices in order to increase the overall performance of the wireless cellular telecommunication network.

To that end, the present invention concerns a method for enabling, in a wireless cellular telecommunication network, at least one mobile terminal to transfer and/or receive data through multiple frequency bands, the at least one mobile terminal being served by a telecommunication device which is able to transfer and/or receive data through at least one frequency band, characterised in that the method comprises the steps, executed by the telecommunication device of:

obtaining at least one mobile terminal carrier aggregation capability of the at least one mobile terminal, determining a coordinated carrier aggregation capability C of the telecommunication device from the at least one mobile terminal carrier aggregation capability, transferring the coordinated carrier aggregation capability C to a centralizing device of the wireless cellular telecommunication network, transferring information related to at least one neighbouring telecommunication device to the centralizing device of the wireless cellular telecommunication network, receiving, from the centralizing device, information indicating at least one frequency band the telecommunication device has to use for communicating with the mobile terminal, transferring control signalling to the at least one telecommunication device through the at least one frequency band the telecommunication device has to use for communicating with the mobile terminal.

The present invention concerns also an apparatus for enabling, in a wireless cellular telecommunication network, at least one mobile terminal to transfer and/or receive data through multiple frequency bands, the at least one mobile terminal being served by a telecommunication device which is able to transfer and/or receive data through at least one frequency band, characterised in that the apparatus is included in the telecommunication device and comprises:

means for obtaining at least one mobile terminal carrier aggregation capability of the at least one mobile terminal, means for determining a coordinated carrier aggregation capability C of the telecommunication device from the at least one mobile terminal carrier aggregation capability, means for transferring the coordinated carrier aggregation capability C to a centralizing device of the wireless cellular telecommunication network, means for transferring information related to at least one neighbouring telecommunication device to the centralizing device of the wireless cellular telecommunication network, means for receiving, from the centralizing device, information indicating at least one frequency band the telecommunication device has to use for communicating with the mobile terminal, means for transferring control signalling to the at least one telecommunication device through the at least one frequency band the telecommunication device has to use for communicating with the mobile terminal.

Thus, the resources allocated to telecommunication devices like home base stations or base stations or relays are used more efficiently. The overall performance of the wireless cellular telecommunication network is then improved.

According to a particular feature, the control signalling indicates at least one frequency band on which data related to the mobile terminal are transferred and which is not allocated to the telecommunication device.

Thus, even if a telecommunication device which serves a mobile terminal has carrier aggregation capability which is lower than the mobile terminal carrier aggregation capability, the mobile terminal can take profit of its ability to transfer and/or receive data through plural frequency bands, since it can transfer and/or receive them to and/or from different telecommunication devices on different frequency bands. Since the control signalling is sent by the serving telecommunication device, this multi-point transmission also called coordinated multi-point transmission is transparent to the mobile terminal.

According to a particular feature, the telecommunication device further transfers carrier aggregation capability C' of the telecommunication device to the centralizing device.

Thus, the centralizing device can allocate C' frequency bands to the telecommunication device and the telecommunication device is able to take benefit of its carrier aggregation capability in order to improve the cell throughput without using coordinated multipoint transmission together with neighbouring telecommunication devices.

According to a particular feature, the coordinated carrier aggregation capability C is one of the following items:
  the maximum mobile terminal carrier aggregation capability among the obtained mobile terminal carrier aggregation capabilities,
  the maximum mobile terminal carrier aggregation capability among a fraction of the obtained mobile terminal carrier aggregation capabilities,
  the maximum between a telecommunication device carrier aggregation capability of the telecommunication device and the maximum mobile terminal carrier aggregation capability among the obtained mobile terminal carrier aggregation capabilities,
  the maximum between the telecommunication device carrier aggregation capability of the telecommunication device and the maximum mobile terminal carrier aggregation capability among a fraction of the obtained mobile terminal carrier aggregation capabilities.

Thus, the coordinated carrier aggregation capability appropriately reflects the needs of a given telecommunication device and the mobile terminals it typically serves in terms of number of frequency bands to be allocated to a given mobile terminal. It results in not allocating too many different frequency bands to neighbouring telecommunication devices when it is useless.

The present invention concerns also a method for determining which frequency bands have to be used, in a wireless cellular telecommunication network, to communicate with at least one mobile terminal, the at least one mobile terminal being served by a telecommunication device which is able to communicate with the at least one mobile terminal through at least one frequency band, characterised in that the method comprises the steps, executed by a centralizing device of the wireless cellular telecommunication network, of:
  receiving from the telecommunication device, a coordinated mobile terminal carrier aggregation capability C of the telecommunication device,
  receiving from the telecommunication device, information related to at least one neighbouring telecommunication device of the telecommunication device,
  determining for the telecommunication device and the at least one neighbouring telecommunication device, the at least one frequency band the telecommunication device has to use for communicating with the at least one mobile terminal and the at least one frequency band the at least one neighbouring telecommunication device has to use for communicating with the at least one mobile terminal or another mobile terminal,
  transferring to the telecommunication device, information indicating to the telecommunication device, the at least one frequency band the telecommunication device has to use for communicating with the at least one mobile terminal.

The present invention concerns also a centralizing device for determining which frequency bands have to be used, in a wireless cellular telecommunication network, to communicate with at least one mobile terminal, the at least one mobile terminal being served by a telecommunication device which is able to communicate with the at least one mobile terminal through at least one frequency band, characterised in that the centralizing device comprises:
  means for receiving from the telecommunication device, a coordinated mobile terminal carrier aggregation capability C of the telecommunication device,
  means for receiving from the telecommunication device, information related to at least one neighbouring telecommunication device of the telecommunication device,
  means for determining for the telecommunication device and the at least one neighbouring telecommunication device, the at least one frequency band the telecommunication device has to use for communicating with the at least one mobile terminal and at least one frequency band the at least one neighbouring telecommunication device has to use for communicating with the at least one mobile terminal, or another mobile terminal,
  means for transferring to the telecommunication device, information indicating to the telecommunication device, the at least one frequency band the telecommunication device has to use for communicating with the at least one mobile terminal.

Thus, the resources allocated to telecommunication devices like home base stations or base stations or relays are used more efficiently. The overall performance of the wireless cellular telecommunication network is then improved.

Even if a telecommunication device which serves a mobile terminal has carrier aggregation capability which is lower than the mobile terminal carrier aggregation capability, the mobile terminal can take profit of its ability to transfer and/or receive data through plural frequency bands.

According to a particular feature, the centralizing device further transfers to the telecommunication device at least one information indicating to the at least one neighbouring telecommunication device, the at least one frequency band to be used for transferring data between the at least one neighbouring telecommunication device and the at least one mobile terminal or another mobile terminal.

Thus, the telecommunication device is informed of the type of coordinated multi-point transmission it can perform with the at least one neighbouring device, i.e., on which frequency band multi-point transmissions can be performed, without having to rely on reports from the mobile terminals it serves.

According to a particular feature, the centralizing device receives carrier aggregation capability C' of the telecommunication devices and the at least one frequency band the telecommunication device has to use for communicating with the at least one mobile terminal and the at least one frequency band the at least one neighbouring telecommunication device has to use for transferring data between the neighbouring telecommunication device and the at least one mobile terminal or another mobile terminal are determined according to the coordinated carrier aggregation capability C of the telecommunication devices and to the carrier aggregation capability C' of the telecommunication devices.

Thus, the centralizing device can allocate C' frequency bands to a telecommunication device and the telecommunication device is able to take benefit of its carrier aggregation capability in order to improve the cell throughput without using coordinated multipoint transmission together with neighbouring telecommunication devices.

According to a particular feature, the centralizing device determines for the telecommunication devices a graph of neighbouring telecommunication devices.

Thus, through the graph, the centralizing device has a good global knowledge of the connectivity between telecommunication devices. A link or connectivity between two telecommunication devices will result in a constraint in allocating frequency bands to telecommunication devices. Thus, with an appropriate graph, the centralizing device knows that there is no constraint in allocating frequency bands to two telecommunication devices which are not connected.

According to a particular feature, the centralizing device determines at least one clique for each telecommunication device, a clique comprising the telecommunication device and at least a part of the neighbouring telecommunication devices having a wireless connectivity with the telecommunication device, the telecommunication devices being linked to each other by a wireless connectivity or by a virtual wireless connectivity created between two telecommunication devices which have no wireless connectivity.

Thus, different frequency bands will be allocated to different telecommunication devices of a clique and, in a clique of size X, it will be possible to send and/or receive data to a same mobile terminal from the telecommunication devices belonging to the clique on X frequency bands, if each telecommunication device is allocated a single frequency band. If some telecommunication devices of the clique are allocated more than one frequency band, it will even be possible to send and/or receive data to a same mobile terminal from the telecommunication devices belonging to the clique on more than X frequency bands.

According to a particular feature, a clique of a telecommunication device comprises at most a number of telecommunication devices such that the total number of frequency bands allocated to the telecommunication devices of the clique is equal to the coordinated carrier aggregation capability.

Thus, the connectivity in the graph is limited to what is really needed in each telecommunication device and the number of frequency bands in the system can be minimised or the usage of coordinated multi-point transmission can be optimised for a given number of frequency bands.

According to a particular feature, if the carrier aggregation capability of a telecommunication device is upper than one, the centralizing device duplicates the telecommunication device prior to determining the graph of neighbouring telecommunication devices.

Thus, the allocation of frequency bands to telecommunication devices is simplified since after duplication, all telecommunication devices can be considered as transmitting and receiving on a single frequency band.

According to a particular feature, the at least one frequency band the telecommunication device has to use for communicating with the mobile terminal and the at least one frequency band the at least one neighbouring telecommunication device has to use for transferring data between the neighbouring telecommunication device and the mobile terminal or the other mobile terminal are determined using a colouring algorithm.

Thus, by representing a frequency band by a colour and using a colouring algorithm optimising the number of colours, the number of necessary frequency bands is minimised.

Furthermore, for a given graph connectivity, i.e., for a given configuration of wireless connectivity between telecommunication devices, the number of frequency bands is minimised and better frequency reuse is obtained. On the other hand, for a given number of available frequency bands, a better graph connectivity is allowed, i.e. telecommunication devices have more neighbouring telecommunication devices and coordinated multi-point transmission is optimised.

According to still another aspect, the present invention concerns computer programs which can be directly loadable into a programmable device, comprising instructions or portions of code for implementing the steps of the method according to the invention, when said computer programs are executed on a programmable device.

The present invention also concerns an information storage means, storing a computer program comprising a set of instructions that can be run by a processor for implementing the aforementioned methods in any one of its various embodiments, when the stored information is read by a computer and run by a processor.

Since the features and advantages relating to the computer programs are the same as those set out above related to the methods and devices according to the invention, they will not be repeated here.

BRIEF DESCRIPTION OF THE DRAWINGS

The characteristics of the invention will emerge more clearly from a reading of the following description of two example embodiments, the said description being produced with reference to the accompanying drawings, among which.

DETAILED DESCRIPTION

Figure 1:
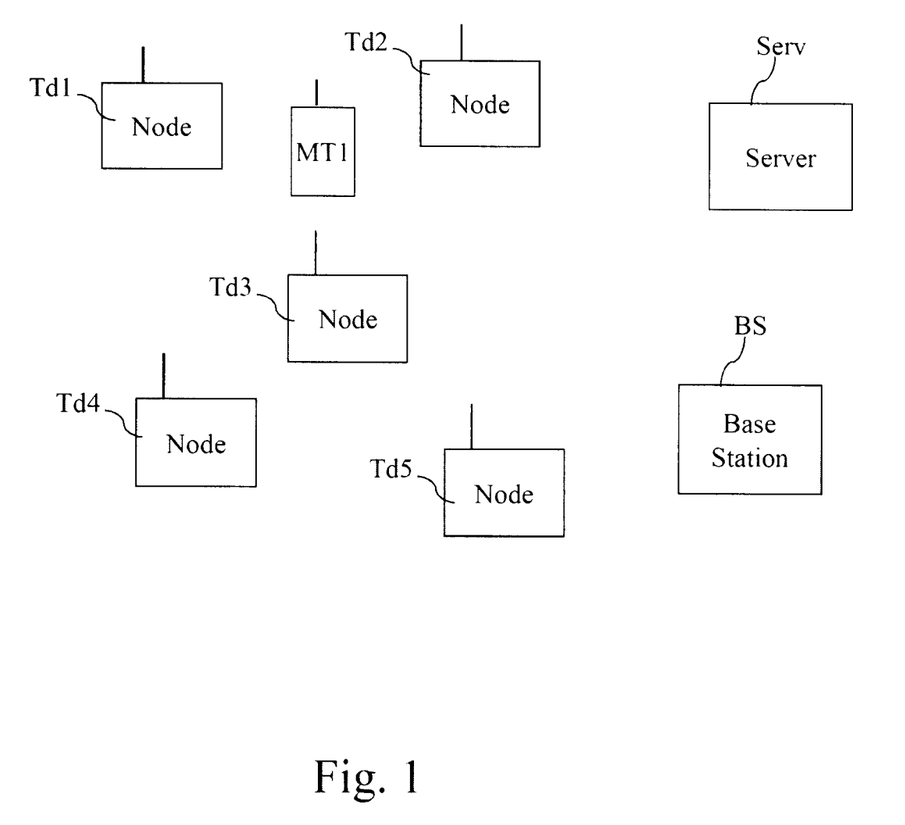
FIG. 1 represents a wireless cellular telecommunication network in which the present invention is implemented.

FIG. 1 represents a wireless cellular telecommunication network in which the present invention is implemented.

In FIG. 1, five telecommunication devices Td1, Td2, Td3, Td4 and Td5 of a wireless cellular telecommunication network are shown.

The telecommunication devices Td1, Td2, Td3, Td4 and Td5 are home base stations and/or base stations and/or relays.

For example, a relay is a home base station which is connected to the wireless cellular telecommunication network via a wireless link with a base station BS, of the wireless cellular telecommunication network.

If the telecommunication devices Td1 to Td5 are home base stations, they are located in the cell of a base station BS which may be in that case, according to the invention a centralizing device.

The server Serv may handle the telecommunication devices Td1 to Td5 and may execute part of the algorithms according to the invention. The server Serv is a centralizing device according to the present invention.

According to a variant, the server Serv is included in one base station BS.

Only five telecommunication devices Td1 to Td5 and one base station BS are shown but we can understand that the present invention works when a more or less important number of telecommunication devices and/or base stations BS exist in the wireless cellular telecommunication network.

The telecommunication devices Td, the server Serv and the base station BS may be linked by a backbone network.

The telecommunication devices Td serve mobile terminals MT located in their respective cells.

The telecommunication device Td1 serves the mobile terminal MT1.

The mobile terminal MT1 is close to the telecommunication devices Td2 and Td3. The mobile terminal MT1 receives the signals transferred by the telecommunication devices Td2 and Td3.

Only one mobile terminal MT1 is shown in FIG. 1 for the sake of clarity but we can understand that the present invention works when a more important number of mobile terminals exist.

If a telecommunication device Td, for example the telecommunication device Td1, is a home base station, it may be located into home and may enable mobile terminals MT associated to the telecommunication device Td1, to access the wireless cellular telecommunication network.

For example, the telecommunication device Td1 and the mobile terminal MT1 are associated when the telecommunication device Td1 belongs to the owner of the mobile terminal MT1 or when the telecommunication device Td1 belongs to the family or friends of the owner of the mobile terminal MT1.

The mobile terminals which are associated to a home base station may belong to a closed subscriber group (CSG) of the home base station.

When a mobile terminal MT is served by a telecommunication device Td, it can receive or establish or continue a communication with a remote telecommunication device through the telecommunication device Td.

The telecommunication device Td1 is able to receive signals transferred by the mobile terminal MT1 which is located in the area or cell of the telecommunication device Td1. The telecommunication device Td1 transfers signals which can be received and processed by the mobile terminal MT1.

In the wireless cellular telecommunication network, heterogeneous deployments mixing base stations deployment and home base stations are foreseen as an effective way to ensure both mobility within a large geographical area and high data throughput, comparable to wireless Local Area Networks.

Coordinated multi-point transmission (CoMP) ensures better cell-edge throughput by allowing plural transmissions of signals between different telecommunication devices Td and the same mobile terminal MT.

Carrier aggregation also ensures throughput increase by allowing telecommunication devices Td to send and/or receive data on several frequency bands with different central carrier frequencies. It enables bandwidth extension in order to have larger cell throughput in a fragmented spectrum by allocating to a telecommunication device Td or to a mobile terminal for instance two bandwidths of 20 MHz instead of a single bandwidth of 40 MHz.

Frequency bands are for example groups of multiple contiguous carrier frequencies. For instance, with an OFDM (Orthogonal Frequency Division Multiplexing) modulation, a group of multiple contiguous carrier frequencies is the group of sub-carriers of an OFDM symbol. For instance, in 3GPP LTE (Third Generation Partnership Project Long Term Evolution), a frequency band is called a component carrier, a component carrier being a transmission bandwidth of an OFDM symbol centered on a given carrier frequency.

However, carrier aggregation puts a large complexity burden on the telecommunication devices. The telecommunication devices Td must have appropriate radio frequency hardware and must be able to handle high data rates.

Thus, low-end telecommunication devices Td like for instance some home base stations or relays may only be able to transmit/receive on a single frequency band or on a reduced amount of frequency bands compared to some base stations BS.

Coordinated multi-point transmission may be handled by several telecommunication devices Td for at least one mobile terminal MT which is able to receive data using carrier aggregation. It may be transparent to the mobile terminal MT, which may behave as if the signal would come from a single telecommunication device Td on several frequency bands. The control signalling is, for example, transmitted from a single telecommunication device, like for example the telecommunication device Td1, and data on each frequency band is sent/received to/from the telecommunication device Td1 and neighbouring telecommunication devices, like the telecommunication devices Td2 and Td3.

The number of frequency bands a telecommunication device Td can send and/or receive data on is called telecommunication device carrier aggregation capability. Likewise, mobile terminals MT have also mobile terminal carrier aggregation capabilities, i.e. they are able to receive and/or send data on a given number of frequency bands which may vary according to the technical design of the mobile terminals MT.

According to the invention, each telecommunication device:

obtains at least one mobile terminal carrier aggregation capability of the at least one mobile terminal, determines a coordinated carrier aggregation capability C of the telecommunication device from the at least one mobile terminal carrier aggregation capability, transfers the coordinated carrier aggregation capability C to a centralizing device of the wireless cellular telecommunication network, transfers information related to at least one neighbouring telecommunication device to the centralizing device of the wireless cellular telecommunication network, receives, from the centralizing device, information indicating at least one frequency band the telecommunication device has to use for communicating with the mobile terminal, transfers control signalling to the at least one telecommunication device through the at least one frequency band the telecommunication device has to use for communicating with the mobile terminal.

According to the invention, the centralizing device, i.e. the base station BS or the server Serv:
- receives from the telecommunication device, a coordinated mobile terminal carrier aggregation capability C of the telecommunication device,
- receives from the telecommunication device, information related to at least one neighbouring telecommunication device of the telecommunication device,
- determines for the telecommunication device and the at least one neighbouring telecommunication device, the at least one frequency band the telecommunication device has to use for communicating with the at least one mobile terminal and the at least one frequency band the at least one neighbouring telecommunication device has to use for communicating with the at least one mobile terminal or another mobile terminal,
- transfers to the telecommunication device, information indicating to the telecommunication device, the at least one frequency band the telecommunication device has to use for communicating with the at least one mobile terminal.

Figure 2:
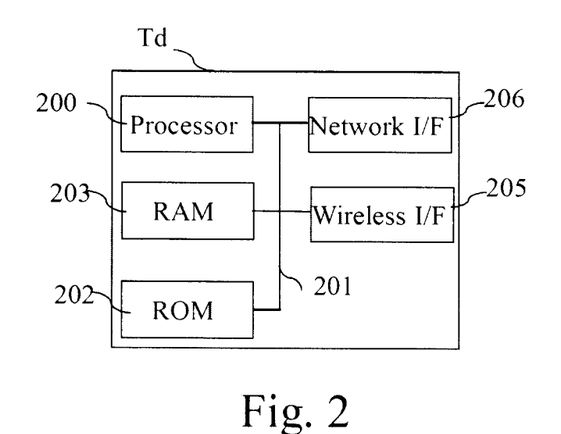
FIG. 2 is a diagram representing the architecture of a telecommunication device in which the present invention is implemented.

FIG. 2 is a diagram representing the architecture of a telecommunication device in which the present invention is implemented.

Figure 5:
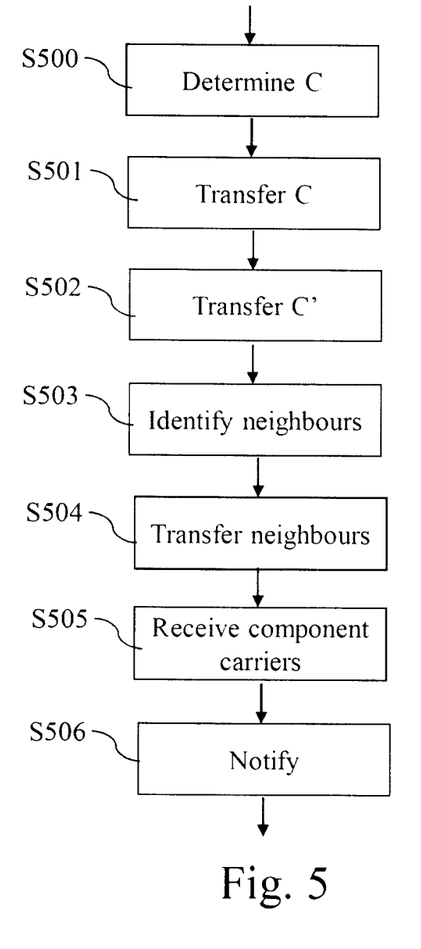
FIG. 5 discloses an example of an algorithm executed by each telecommunication device according to the present invention.

The telecommunication device Td has, for example, an architecture based on components connected together by a bus 201 and a processor 200 controlled by the program as disclosed in FIG. 5.

The bus 201 links the processor 200 to a read only memory ROM 202, a random access memory RAM 203, a wireless interface 205. The bus 201 may link the processor 200 to a network interface 206.

The memory 203 contains registers intended to receive variables and the instructions of the program related to the algorithm as disclosed in FIG. 5.

The processor 200 controls the operation of the network interface 206 and controls the operation of the wireless interface 205.

The read only memory 202 contains instructions of the program related to the algorithm as disclosed in FIG. 5, which are transferred, when the telecommunication device Td is powered on, to the random access memory 203.

The telecommunication device Td may be connected to a backbone network through the network interface 206. For example, the network interface 206 is a Digital Subscriber Line (DSL) modem, or an Integrated Services Digital Network (ISDN) interface, etc.

Through the wireless interface 205 or through the network interface 206, the telecommunication device Td transfers and/or receives messages to and/or from the base station BS the cell in which the telecommunication device Td is located or to and/or from the server Serv.

The wireless interface 205 comprises means for transferring signals on at least one frequency band allocated to the telecommunication device Td by the server Serv or the base station BS.

The wireless interface 205 may comprise means for receiving measurement reports from at least one mobile terminal MT served by the telecommunication device Td.

The function of the network interface 206 may be executed by the wireless interface 205 if the telecommunication device Td is a relay.

The wireless interface 205 and the network interface 206 are the resources of the telecommunication device Td used by a mobile terminal MT in order to access to the wireless cellular telecommunication network when the mobile terminal MT establishes or receives a communication with a remote telecommunication device.

Figure 3:
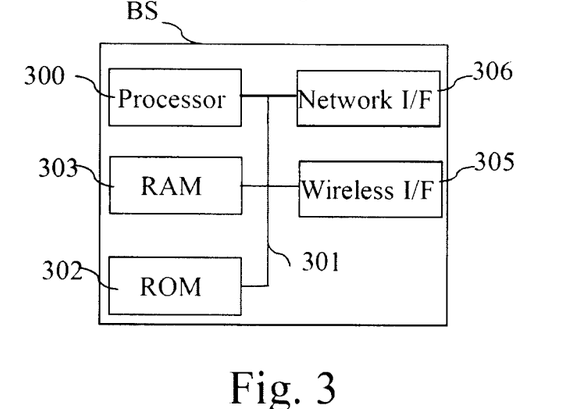
FIG. 3 is a diagram representing the architecture of a base station in which the present invention is implemented.

FIG. 3 is a diagram representing the architecture of a base station in which the present invention may be implemented.

The base station BS has, for example, an architecture based on components connected together by a bus 301 and a processor 300 controlled by the program as disclosed in FIGS. 5, 6, 7 and 8.

The bus 301 links the processor 300 to a read only memory ROM 302, a random access memory RAM 303, a wireless interface 305 and a network interface 306. The memory 303 contains registers intended to receive variables and the instructions of the program related to the algorithms as disclosed in FIGS. 5, 6, 7 and 8.

The processor 300 controls the operation of the network interface 306 and controls the operation of the wireless interface 305.

The read only memory 302 contains instructions of the programs related to the algorithms as disclosed in FIGS. 5, 6, 7 and 8, which are transferred, when the base station BS is powered on, to the random access memory 303.

The base station BS is connected to a backbone network through the network interface 306. For example, the network interface 306 is a DSL modem, or an ISDN interface, etc. Through the network interface 306, the base station BS may transfer and/or receive messages to and/or from the telecommunication devices Td located in the cell of the base station BS.

The wireless interface 305 comprises means for transferring signals on at least one frequency band allocated to the base station BS.

The wireless interface 305 may comprise means for receiving measurement reports from at least one mobile terminal MT served by the base station BS.

The wireless interface 305 and the network interface 306 are the resources of the base station BS used by a mobile terminal MT in order to access to the wireless cellular telecommunication network when the mobile terminal MT establishes or receives a communication with a remote telecommunication device.

Figure 4:
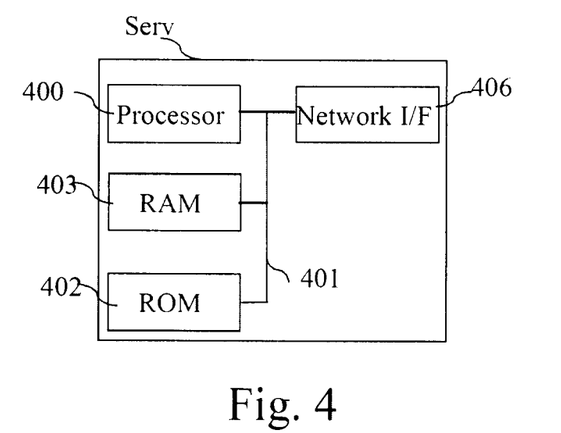
FIG. 4 is a diagram representing the architecture of a server in which the present invention is implemented.

FIG. 4 is a diagram representing the architecture of a server in which the present invention may be implemented.

Figure 6:
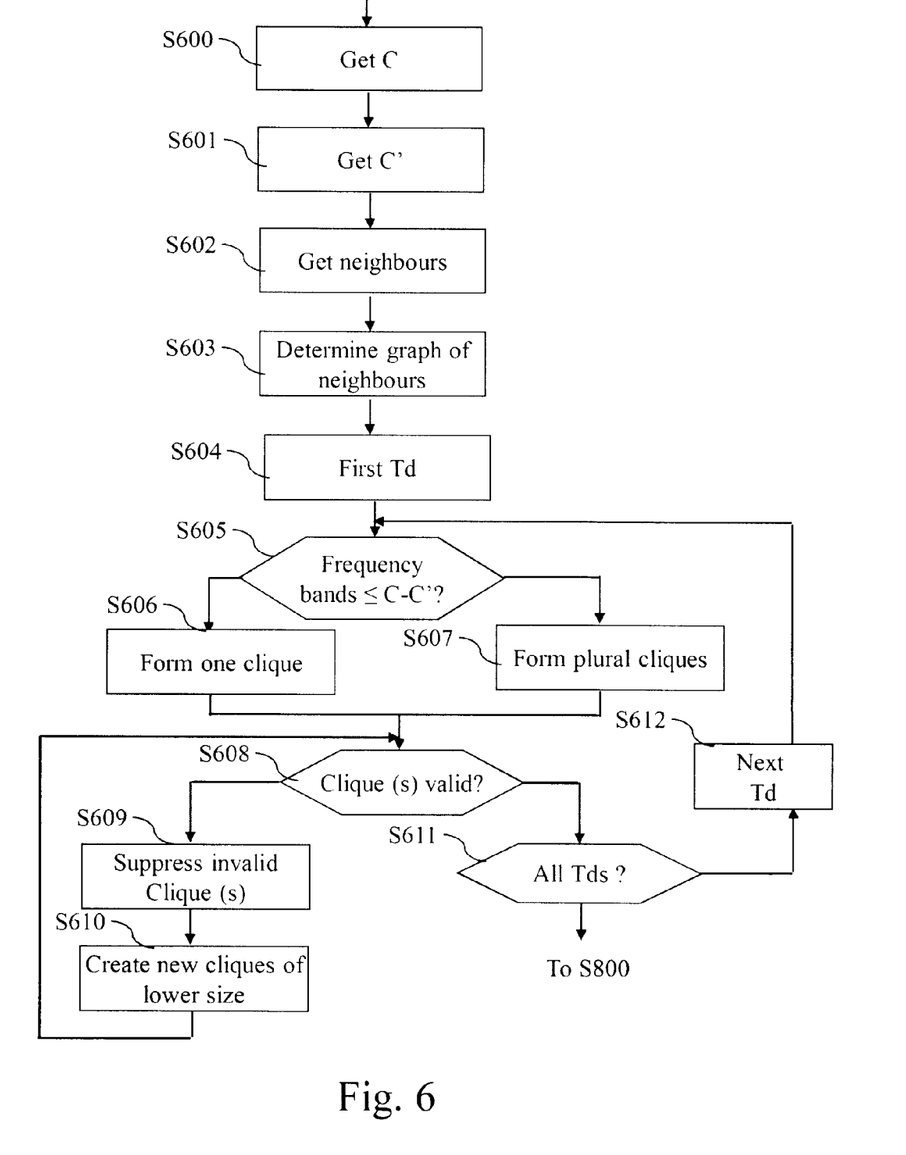
FIG. 6 discloses an example of a first algorithm executed by the server or the base station according to a first mode of realization of the present invention.
Figure 7:
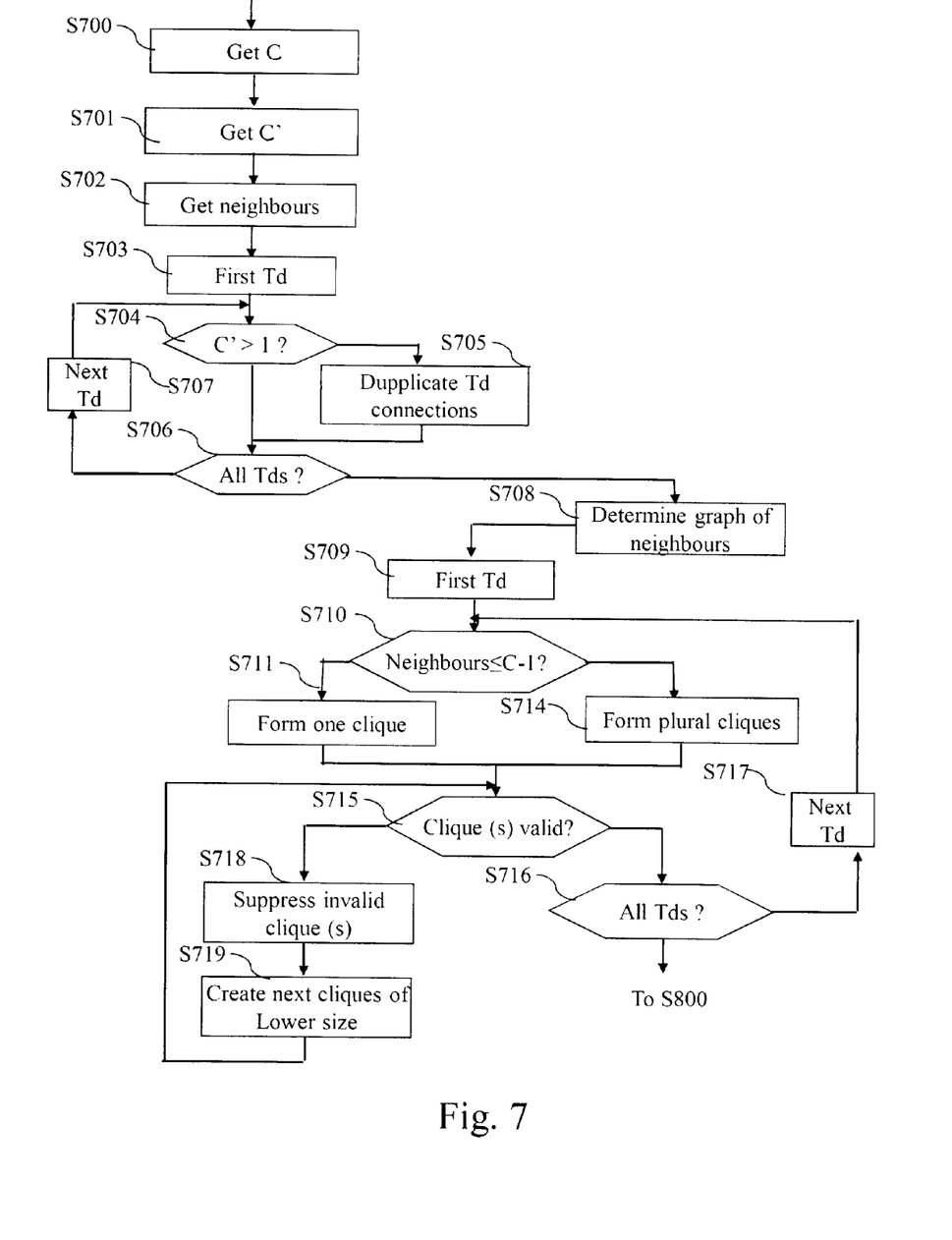
FIG. 7 discloses an example of a second algorithm executed by the server or the base station according to a second mode of realization of the present invention.
Figure 8:
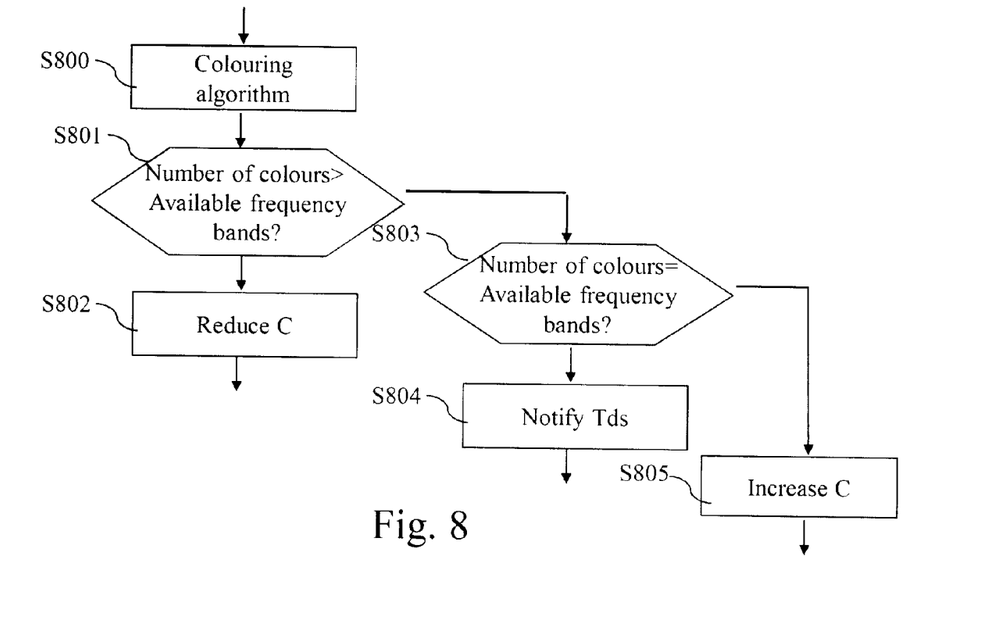
FIG. 8 discloses an example of a third algorithm executed by the server or the base station according to the first and second modes of realization of the present invention.

The server Serv has, for example, an architecture based on components connected together by a bus 401 and a processor 400 controlled by the programs as disclosed in FIGS. 6, 7 and 8.

The bus 401 links the processor 400 to a read only memory ROM 402, a random access memory RAM 403 and a network interface 406.

The random access memory 403 contains registers intended to receive variables and the instructions of the programs related to the algorithms as disclosed in FIGS. 6, 7 and 8.

The processor 400 controls the operation of the network interface 406.

The read only memory 402 contains instructions of the programs related to the algorithms as disclosed in FIGS. 6, 7 and 8, which are transferred, when the server Serv is powered on, to the random access memory 403.

The server Serv is connected to a backbone network through the network interface 406. For example, the network interface 406 is a DSL modem, or an ISDN interface, etc. Through the network interface 406, the server Serv may transfer and/or receive messages to and/or from the telecommunication devices Td handled by the server Serv.

It has to be noted here that the server Serv may be included in a base station BS.

Any and all steps of the algorithms described hereinafter with regard to FIGS. 5 and/or 6 and/or 7 and/or 8, may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

The algorithm disclosed in reference to the FIG. 5 may be executed one time each time a new mobile terminal MT is served or is not served anymore by a telecommunication device Td or when measurements used by the algorithm change.

The algorithms disclosed in reference to the FIGS. 6, 7 and 8 may be executed several times each time a new mobile terminal MT is served or is not served anymore by a telecommunication device Td or when measurements used by the algorithms change.

FIG. 5 discloses an example of an algorithm executed by each telecommunication device according to the present invention.

More precisely, the present algorithm is executed by the processor 200 of each telecommunication device Td and/or by a base station BS for the mobile terminals MT the base station BS serves.

The present algorithm will be disclosed in an example wherein it is executed by a telecommunication device Td.

At step S500, the processor 200 obtains the mobile terminal carrier aggregation capability of at least one mobile terminal associated to the telecommunication device Td.

The processor 200 may obtain the mobile terminal carrier aggregation capability of each mobile terminal associated to telecommunication device Td or may obtain the mobile terminal carrier aggregation capability of each mobile terminal associated to the telecommunication device Td and served by the telecommunication device Td at a given time, for example, currently served by the telecommunication device Td, or may obtain the mobile terminal carrier aggregation capability of each mobile terminal served by the telecommunication device Td at a given time.

From the at least one obtained mobile terminal carrier aggregation capability, the processor 200 determines a coordinated carrier aggregation capability C of the telecommunication device Td.

The coordinated carrier aggregation capability C may be the maximum mobile terminal carrier aggregation capability among the obtained mobile terminal carrier aggregation capabilities.

The coordinated carrier aggregation capability C may be the maximum mobile terminal carrier aggregation capability among a fraction of the obtained mobile terminal carrier aggregation capabilities.

The coordinated carrier aggregation capability C may be the maximum between the telecommunication device Td carrier aggregation capability and the maximum mobile terminal carrier aggregation capability among the obtained mobile terminal carrier aggregation capabilities.

The coordinated carrier aggregation capability C may be the maximum between the telecommunication device Td carrier aggregation capability and the maximum mobile terminal carrier aggregation capability among a fraction of the obtained mobile terminal carrier aggregation capabilities.

For example, the fraction of the obtained mobile terminal carrier aggregation capabilities is a predetermined percentage of obtained mobile terminal carrier aggregation capabilities and which have lowest values among the overall obtained mobile terminal carrier aggregation capabilities. For instance, the predetermined percentage is 95%.

For example, the fraction of the obtained mobile terminal carrier aggregation capabilities represents obtained mobile terminal carrier aggregation capabilities which are served 95% of the cumulated time during which mobile terminals corresponding to obtained mobile terminal carrier aggregation capabilities are served by the telecommunication device Td.

It has to be noted here that the different rules for determining the coordinated carrier aggregation capability C of the telecommunication device Td may vary over time, for example, for night hours and day hours. The coordinated carrier aggregation capability C may also vary over time, for example, for night hours and day hours, even if the rule remains the same.

At next step S501, the processor 200 commands the transfer of the coordinated carrier aggregation capability C of the telecommunication device Td to the base station BS or to the server Serv through the network interface 206 or through the wireless interface 205 if the telecommunication device Td acts as a relay.

At next step S502, the processor 200 commands the transfer of the telecommunication device carrier aggregation capability C' to the base station BS or to the server Serv through the network interface 206 or through the wireless interface 205 if the telecommunication device Td acts as a relay.

The telecommunication device carrier aggregation capability C' is for example stored in the ROM memory 402 or in the RAM memory 403 of the telecommunication device Td.

It has to be noted here that, if the telecommunication device carrier aggregation capability C' is the same for all the telecommunication devices Td located in the area managed by the server Serv or in the cell of the base station BS, the processor 200 does not execute the step S502 and moves from step S501 to step S503.

At next step S503, the processor 200 identifies each neighbouring telecommunication device Td that may perform coordinated multi-point transmission, i.e. may share the transmission and/or the reception of data to and/or from at least one mobile terminal served by the telecommunication device Td.

For example, the processor 200 identifies, from at least one measurement report transferred by at least one mobile terminal served by the telecommunication device Td or from measurements executed by the wireless interface 205, when the wireless interface comprises means for measuring downlink signals received by the telecommunication device Td, the neighbouring telecommunication devices Td that can transfer signals that can be received by the at least one mobile terminal MT at a reception power upper than a predetermined threshold.

For example, the processor 200 identifies the neighbouring telecommunication devices Td which transfer signals which are received by the at least one mobile terminal MT at a reception power not degraded more than a predetermined threshold compared to the reception power of the signals transferred by the telecommunication device Td.

For example, the processor 200 identifies the list of neighbouring telecommunication devices Td which transfer signals which are received by the at least one mobile terminal MT at a signal to interference plus noise ratio which is upper than a given value.

The processor 200 may combine also the above mentioned examples for identifying the neighbouring telecommunication devices Td.

For example, for signals transferred by the at least one mobile terminal MT, the processor 200 identifies, from at least one measurement report transferred by other telecommunication devices Td, the telecommunication devices Td that can receive signals transferred by the at least one mobile terminal MT at a reception power upper than a predetermined threshold and/or the telecommunication devices Td that can receive signals transferred by the at least one mobile terminal MT at a reception power not degraded more than a predetermined threshold compared to the reception power at the telecommunication device Td and/or the telecommunication devices Td that can receive signals transferred by the at least one mobile terminal MT at a signal to interference plus noise ratio (SINR) which is upper than a given value.

For example, the processor 200 identifies, from handover history of mobile terminals MT, neighbouring telecommunication devices Td.

From a general point of view, neighbouring telecommunication devices Td are other telecommunication devices Td for which the path gain between the other telecommunication devices Td and the at least one mobile terminal MT served by the telecommunication device Td is upper than a given value.

For example, when the present algorithm is executed by the telecommunication device Td1, the telecommunication devices Td2 and Td3 are identified as neighbouring telecommunication devices.

At next step S504, the processor 200 commands the transfer of the list of neighbouring telecommunication devices Td. The list of neighbouring telecommunication devices Td is transferred to the base station BS or to the server Serv through the network interface 206 or through the wireless interface 205 if the telecommunication device Td acts as a relay.

At the same time, the link conditions between the telecommunication device Td and each neighbouring telecommunication device Td, i.e. the measurements on signals between the telecommunication device Td and each neighbouring telecommunication device Td or measurements on signals between the at least one mobile terminal MT served by the telecommunication device Td and each neighbouring telecommunication device Td, may also be transferred to the base station BS or to the server Serv.

At next step S505, the processor 200 detects the reception, through the network interface 206 or through the wireless interface 205 if the telecommunication device Td acts as a relay, of information indicating the at least one frequency band allocated to the telecommunication device Td.

At the same time, the processor 200 may also detect the reception of at least one frequency band allocated to at least one neighbouring telecommunication device Td, for transferring and/or receiving signals to and/or from a mobile terminal MT served by the telecommunication device Td.

At next step S506, the processor 200 commands the transfer, to each mobile terminal MT served by the telecommunication device Td, of the control signalling and data to/from mobile terminals on all or a subset of the C' frequency bands allocated to the telecommunication device Td.

The coordinated multi-point transmission with carrier aggregation is performed with at least one neighbouring telecommunication device Td by signalling carrier aggregation involving frequency bands which are not part of the C' frequency bands allocated to the telecommunication device Td.

The processor 200 may command the transfer and/or the reception of data to/from mobile terminals MT not served by the telecommunication device Td and served by a neighbouring telecommunication device Td.

After that, the processor 200 interrupts the present algorithm.

FIG. 6 discloses an example of a first algorithm executed by the server or the base station according to a first mode of realization of the present invention.

More precisely, the present algorithm is executed by the processor 300 of the base station BS or by the processor 400 of the server Serv.

The present algorithm will be described, for example, when it is executed by the processor 400 of the server Serv.

At step S600 of FIG. 6, the processor 400 detects the reception, through the network interface 406, of the coordinated carrier aggregation capability C of at least one telecommunication device Td located in the area managed by the server Serv.

At next step S601, the processor 400 detects the reception, through the network interface 406, of the telecommunication device carrier aggregation capability C' of at least one telecommunication device Td located in the area managed by the server Serv.

At next step S602, the processor 400 detects the reception, through the network interface 406 and for at least one telecommunication device Td located in the area managed by the server Serv, of the list of neighbouring telecommunication devices and/or the measurement values obtained at step S503 of the algorithm of FIG. 5.

At next step S603, the processor 400 determines, for all the telecommunication devices Td located in the area managed by the server Serv, a graph of neighbouring telecommunication devices Td according to the list of neighbouring telecommunication devices and/or the measurement values received at step S602.

A graph is a set of nodes connected by edges. A node is a telecommunication device and neighbouring telecommunication devices are connected by edges, named also connections. When there is a wireless connectivity between two neighbouring telecommunication devices, the two neighbouring telecommunication devices are connected by an edge. A wireless connectivity associates two telecommunication devices identified as neighbours.

At next step S604, the processor 400 considers a first telecommunication device Td among the telecommunication devices the server Serv is in charge of.

At next step S605, the processor 400 checks, for the considered telecommunication device Td, if the number of frequency bands of the neighbouring telecommunication devices Td is lower than or equal to the C minus C'.

If the number of frequency bands of neighbouring telecommunication devices Td is lower than or equal to C minus C', the processor 400 moves to step S606.

If the number of frequency bands of neighbouring nodes is upper than C minus C', the processor 400 moves to step S607.

At step S606, the processor 400 forms, for the telecommunication device Td, a clique of a size equal to the number of neighbouring telecommunication devices Td plus one, corresponding to at most C frequency bands.

A clique comprises telecommunication devices which are linked to each other by a wireless connectivity as disclosed or by a virtual wireless connectivity created between two telecommunication devices which have no wireless connectivity after the step S603. In other words, edges, i.e. connections, between telecommunication devices Td which are not neighbouring telecommunication devices of each other after step S603, are added in order to form a clique of appropriate size. The size of a clique is the number of telecommunication devices in a clique.

A virtual wireless connectivity is an edge.

For example, a wireless connectivity between the telecommunication devices Td1 and Td2 and a wireless connectivity between the telecommunication devices Td1 and Td3 are established at step S603 but no wireless connectivity is established between the telecommunication devices Td2 and Td3.

For example, if the telecommunication device Td1 has a coordinated carrier aggregation capability C equal to three and the telecommunication devices Td1, Td2 and Td3 have a telecommunication device carrier aggregation capability C' equal to one, the processor 400 forms a virtual wireless connectivity between the telecommunication devices Td2 and Td3. Thus, it forms the clique comprising the telecommunication devices Td1, Td2 and Td3.

A telecommunication device Td with coordinated carrier aggregation capability C belongs to a clique of X telecommunication devices corresponding to C frequency bands. A clique of X telecommunication devices Td is a set of X telecommunication devices, which are all connected to each other.

After that, the processor 400 moves to step S608.

At step S607, the processor 400 forms, for the telecommunication device Td, plural cliques of size which corresponds to C frequency bands.

For example, if the telecommunication device Td1 has a coordinated carrier aggregation capability C equal to two and the telecommunication devices Td1, Td2 and Td3 have a telecommunication device carrier aggregation capability C' equal to one, the processor 400 forms two cliques of size two.

A first clique comprises the telecommunication devices Td1 and Td2 and a second clique comprises the telecommunication devices Td1 and Td3.

At next step S608, the processor 400 checks if the or each formed clique of size larger than or equal to two is valid using measurements received at step S602.

A clique is not valid if the path gain between one telecommunication device of the clique and each of the at least one mobile terminal MT served by the telecommunication device Td1 is not upper than a given value or if the signal to interference plus noise ratio improvement or throughput improvement brought by performing coordinated multi-point transmission from all the telecommunication devices Td of the clique compared to performing coordinated multi-point transmission from a lower number of telecommunication devices Td of the clique is not upper than a given value for all mobile terminals MT served by the telecommunication device Td1.

If at least one clique is not valid, the processor 400 moves to step S609. Otherwise, the processor 400 moves to step S611.

At step S609, the processor 400 suppresses each invalid clique.

At next step S610, the processor 400 forms, from each invalid clique, at least two cliques comprising each a reduced number of telecommunication devices Td.

After that, the processor 400 returns to step S608.

It has to be noted here that the steps S608, S609 and S610 are optional.

At step S611, the processor 400 checks if all telecommunication devices Td have been considered.

If all telecommunication devices Td have been considered, the processor 400 moves to step S800 of the algorithm of FIG. 8. Otherwise, the processor 400 moves to step S612, considers another telecommunication device and returns to step S605.

FIG. 7 discloses an example of a second algorithm executed by the server or the base station according to a second mode of realization of the present invention.

More precisely, the present algorithm or at least a part of the algorithm is executed by the processor 300 of the base station BS or by the processor 400 of the server Serv.

The present algorithm will be described, for example, when it is executed by the processor 400 of the server Serv.

At step S700 of FIG. 7, the processor 400 detects the reception, through the network interface 406, of the coordinated carrier aggregation capability C of at least one telecommunication device Td located in the area managed by the server Serv.

At next step S701, the processor 400 detects the reception, through the network interface 406, of the telecommunication device carrier aggregation capability C' of the at least one telecommunication device Td located in the area managed by the server Serv.

At next step S702, the processor 400 detects the reception, through the network interface 406 and for at least one telecommunication device Td located in the area managed by the server Serv, of the list of neighbouring telecommunication devices Td and/or the measurement values obtained at step S503 of the algorithm of FIG. 5.

At next step S703, the processor 400 considers a first telecommunication device Td among the telecommunication devices Td the server Serv is in charge of.

At next step S704, the processor 400 checks, for the considered telecommunication device Td, if telecommunication device carrier aggregation capability C' is upper than one.

If telecommunication device carrier aggregation capability C' is upper than one, the processor 400 moves to step S705. Otherwise, the processor 400 moves to step S706.

At step S705, the processor 400 duplicates the telecommunication device into C' duplicated telecommunication devices Td which replace the telecommunication device Td which has been duplicated. The duplicated telecommunication devices Td are considered as neighbouring telecommunication devices of each other and are neighbours of the neighbours of the telecommunication device Td which has been duplicated.

After this operation, each telecommunication device carrier aggregation capability C' is set to one.

After that, the processor 400 moves to step S706.

At step S706, the processor 400 checks if all telecommunication devices Td have been considered.

If all telecommunication devices Td have been considered, the processor 400 moves to step S708. Otherwise, the processor 400 moves to step S707, considers another telecommunication device and returns to step S704.

At step S708, the processor 400 determines, for all the telecommunication devices Td located in the area managed by the server Serv, a graph of neighbouring telecommunication devices according to the list of neighbouring telecommunication devices and/or the measurement values received at step S702.

At next step S709, the processor 400 considers a first telecommunication device Td among the telecommunication devices Td and duplicated telecommunication devices Td the server Serv is in charge of.

At next step S710, the processor 400 checks, for the considered telecommunication device Td, if the number of neighbouring telecommunication devices Td is lower than or equal to C minus one.

If the number of neighbouring nodes is lower than or equal to C minus one, the processor 400 moves to step S711.

If the number of neighbouring nodes is upper than C minus one, the processor 400 moves to step S714.

At step S711, the processor 400 forms, for the telecommunication device Td, a clique of a size equal to the number of neighbouring nodes plus one.

After that, the processor 400 moves to step S715.

At step S714, the processor 400 forms, for the telecommunication device Td, plural cliques of size C.

At next step S715, the processor 400 checks if the or each formed clique of size larger than or equal to two is valid using measurements received at step S702.

If at least one clique is not valid, the processor 400 moves to step S718. Otherwise, the processor 400 moves to step S716.

At step S718, the processor 400 suppresses each invalid clique.

At next step S719, the processor 400 forms, from each invalid clique, at least two cliques comprising each a reduced number of telecommunication devices.

It has to be noted here that the steps S715, S718 and S719 are optional.

After that, the processor 400 returns to step S715.

At step S716, the processor 400 checks if all telecommunication devices Td have been considered.

If all telecommunication devices Td have been considered, the processor 400 moves to step S800 of the algorithm of FIG. 8. Otherwise, the processor 400 moves to step S717, considers another telecommunication device and returns to step S710.

FIG. 8 discloses an example of a third algorithm executed by the server or the base station according to the first and second modes of realization of the present invention.

At step S800, the processor 400 determines, for each telecommunication device Td, which frequency band or frequency bands has or have to be allocated to the telecommunication device Td insuring that one frequency band is not allocated twice to the same telecommunication device Td and/or to two telecommunication devices Td belonging to the same clique, i.e. to two telecommunication devices Td which are linked by a wireless connection or by a virtual wireless connection.

For example, the processor 400 executes a graph colouring algorithm.

A graph colouring is a special case of graph labelling. It is an assignment of labels traditionally called "colours" to telecommunication devices Td of a graph subject to certain constraints. The processor 400 performs telecommunication device colouring and assigns one or plural colours to each telecommunication device Td so that two adjacent telecommunication devices Td, i.e. nodes connected by an edge or by a wireless connection or by a virtual wireless connection, do not share the same colour.

Graph colouring algorithms in the present invention are algorithms that find the minimal number of frequency bands (colours) for a given graph such that two adjacent telecommunication devices do not use the same frequency band for sending/receiving data to/from mobile terminals MT.

Greedy colouring algorithm is among the most popular and well known algorithms for graph colouring. The principle of the greedy colouring methods is to consider each telecommunication device Td of the graph following a certain order and to assign to the telecommunication device Td, the first available colour, i.e. frequency band, that is not in conflict with adjacent telecommunication devices Td.

For instance, the graph colouring algorithm may be a tree decomposition graph colouring or clique decomposition graph colouring which starts by decomposing the original graph into a tree of cliques, then greedy colouring is performed on the cliques with a given ordering.

Different orderings will define different graph colouring algorithms.

For example, ordering is defined as the largest first colouring. The frequency bands are first allocated to the telecommunication devices Td starting from the telecommunication device Td with the largest degree in the graph. The degree of a telecommunication device Td is the number of connections of the telecommunication device Td.

For example, ordering is defined as a random colouring. The frequency bands are first allocated to the telecommunication devices Td according to a random ordering.

For example, ordering is defined as a lexicographical colouring. The frequency bands are first allocated to the telecommunication devices Td according to an ordering based on its position, with respect to a base station for example.

For example, ordering is defined as the smallest last colouring with the ordering calculated recursively. At start, the current ordering is empty. At first step, the telecommunication device Td which has the lowest degree is identified, put in the first position of the current ordering. At second step, the telecommunication device Td and its connections are removed and the degree of remaining the telecommunication devices Td is recalculated. First and second steps are rerun until the ordering is completed.

For example, if the telecommunication device Td1 has a coordinated carrier aggregation capability C=3 and the telecommunication devices Td1, Td2 and Td3 have a carrier aggregation capability C'=1, the telecommunication device Td1 forms a clique with its two neighbouring telecommunication devices Td2 and Td3.

The telecommunication devices Td1, Td2 and Td3 get different colours, i.e. frequency bands, after colouring. A carrier aggregation of three frequency bands can be performed by sending data to and/or receiving data from the same mobile terminal from/at the three telecommunication devices Td1 to Td3 on the three different frequency bands.

At next step S801, the processor 400 checks if the total number of colours outputted for the cliques is upper than the amount of available colours, i.e. the number of available frequency bands.

If the total number of colours outputted for the cliques is upper than the amount of available colours, the processor 400 moves to step S802. Otherwise, the processor 400 moves to step S803.

At step S802, the processor 400 reduces the value of C for at least one telecommunication device of the graph of neighbours.

For example, the processor 400 reduces the coordinated carrier aggregation capability C for at least one telecommunication device arbitrarily and/or reduces the fraction of obtained mobile terminals carrier aggregation capabilities the maximum of which is taken in order to determine the coordinated carrier aggregation capability C and/or suppresses some wireless connectivity and/or virtual wireless connectivity corresponding to weak path gains using measurements received at step S602 or S702 and/or suppresses some virtual wireless connectivity and/or suppresses some cliques corresponding to multi-point transmission not guaranteeing sufficiently good performance improvement and/or suppresses some wireless connectivity corresponding to poor backhaul link conditions, i.e. low throughput and/or high latency, between telecommunication devices Td.

After that, the processor 400 returns to step S604 of FIG. 6 or S709 of FIG. 7 or returns to step S800.

At step S803, the processor 400 checks if the total number of colours outputted for the cliques is equal to the amount of available colours, i.e. the number of available frequency bands.

If the total number of colours outputted for the cliques is equal to the amount of available colours, the processor 400 moves to step S804. Otherwise, the processor 400 moves to step S805.

At step S804, the processor 400 commands the transfer, to each telecommunication device Td, of information indicating the at least one frequency band allocated to the telecommunication device Td.

At the same time, the processor 400 may transfer at least one frequency band allocated to a neighbouring telecommunication device for transferring and/or receiving signals to and/or from a mobile terminal served by the telecommunication device Td.

At the same time, the processor 400 may command the transfer to each telecommunication device of identifiers of telecommunication devices belonging to its clique or cliques.

At the same time, the processor 400 may command the transfer to each telecommunication device of its modified coordinated carrier aggregation capability.

After that, the processor 400 interrupts the present algorithm and waits until the reception of at least one coordinated carrier aggregation capability C and/or at least one telecommunication device carrier aggregation capability C' and/or at least one new neighbouring telecommunication device and/or at least one new report of at least one telecommunication device Td the server Serv handles.

At step S805, the processor 400 increases the value of C for at least one telecommunication device of the graph of neighbours.

For example, the processor 400 increases the coordinated carrier aggregation capability C for at least one telecommunication device arbitrarily and/or or increases the fraction of obtained mobile terminals carrier aggregation capabilities the maximum of which is taken in order to determine the coordinated carrier aggregation capability C and/or adds some wireless connectivity and/or virtual wireless connectivity corresponding to strong path gains using measurements received at step S602 or S702 and/or adds some virtual wireless connectivity and/or adds some cliques corresponding to multi-point transmission not guaranteeing sufficiently good performance improvement and/or adds some wireless connectivity corresponding to strong backhaul link conditions, i.e. high throughput and/or low latency, between telecommunication devices Td.

After that, the processor 400 returns to step S604 of FIG. 6 or S709 of FIG. 7 or returns to step S800.

It has to be noted here that the steps S604 to S612 or S709 to S717 may be executed only for the telecommunication device or devices Td for which the value of C is modified.

Naturally, many modifications can be made to the embodiments of the invention described above without departing from the scope of the present invention.

The invention claimed is:

1. Method for enabling, in a wireless cellular telecommunication network, at least one mobile terminal to communicate data through multiple frequency bands, the at least one mobile terminal being served by a telecommunication device which is able to communicate data through at least one frequency band, wherein the method comprises the steps, executed by the telecommunication device of:

obtaining at least one mobile terminal carrier aggregation capability of the at least one mobile terminal, determining a coordinated carrier aggregation capability C of the telecommunication device from the at least one mobile terminal carrier aggregation capability, transferring the coordinated carrier aggregation capability C to a centralizing device of the wireless cellular telecommunication network, transferring information related to at least one neighboring telecommunication device to the centralizing device of the wireless cellular telecommunication network, receiving, from the centralizing device, information indicating at least one frequency band the telecommunication device has to use for communicating with the mobile terminal, transferring control signaling to the at least one telecommunication device through the at least one frequency band the telecommunication device has to use for communicating with the mobile terminal.

2. Method according to claim 1, wherein the control signaling indicates at least one frequency band on which data related to the mobile terminal are transferred and which is not allocated to the telecommunication device.

3. Method according to claim 1, wherein the method comprises further step of transferring carrier aggregation capability C' of the telecommunication device to the centralizing device.

4. Method according to claim 1, wherein the coordinated carrier aggregation capability C is one of the following items:

the maximum mobile terminal carrier aggregation capability among the obtained mobile terminal carrier aggregation capabilities, the maximum mobile terminal carrier aggregation capability among a fraction of the obtained mobile terminal carrier aggregation capabilities, the maximum between a telecommunication device carrier aggregation capability of the telecommunication device and the maximum mobile terminal carrier aggregation capability among the obtained mobile terminal carrier aggregation capabilities, the maximum between the telecommunication device carrier aggregation capability of the telecommunication device and the maximum mobile terminal carrier aggregation capability among a fraction of the obtained mobile terminal carrier aggregation capabilities.

5. Method for determining which frequency bands have to be used, in a wireless cellular telecommunication network, to communicate with at least one mobile terminal, the at least one mobile terminal being served by a telecommunication device which is able to communicate with the at least one mobile terminal through at least one frequency band, wherein the method comprises the steps, executed by a centralizing device of the wireless cellular telecommunication network, of:

receiving from the telecommunication device, a coordinated mobile terminal carrier aggregation capability C of the telecommunication device, receiving from the telecommunication device, information related to at least one neighboring telecommunication device of the telecommunication device, determining for the telecommunication device and the at least one neighboring telecommunication device, the at least one frequency band the telecommunication device has to use for communicating with the at least one mobile terminal and the at least one frequency band the at least one neighboring telecommunication device has to use for communicating with the at least one mobile terminal or another mobile terminal, transferring to the telecommunication device, information indicating to the telecommunication device, the at least one frequency band the telecommunication device has to use for communicating with the at least one mobile terminal.

6. Method according to claim 5, wherein the centralizing device further transfers to the telecommunication device at least one information indicating to the at least one neighboring telecommunication device, the at least one frequency band to be used for transferring data between the at least one neighboring telecommunication device and the at least one mobile terminal or another mobile terminal.

7. Method according to claim 5, wherein the method comprises further step executed by the centralizing device of receiving carrier aggregation capability C' of the telecommunication devices and in that the at least one frequency band the telecommunication device has to use for communicating with the at least one mobile terminal and the at least one frequency band the at least one neighboring telecommunication device has to use for transferring data between the neighboring telecommunication device and the at least one mobile terminal or another mobile terminal are determined according to the coordinated carrier aggregation capability C of the telecommunication devices and to the carrier aggregation capability C' of the telecommunication devices.

8. Method according to claim 5, wherein the method comprises further step executed by the centralizing device of determining for the telecommunication devices a graph of neighboring telecommunication devices.

9. Method according to claim 8, wherein the method comprises further step executed by the centralizing device of determining at least one clique for each telecommunication device, a clique comprising the telecommunication device and at least a part of the neighboring telecommunication devices having a wireless connectivity with the telecommunication device, the telecommunication devices being linked to each other by a wireless connectivity or by a virtual wireless connectivity created between two telecommunication devices which have no wireless connectivity.

10. Method according to claim 9, wherein a clique of a telecommunication device comprises at most a number of telecommunication devices such that the total number of frequency bands allocated to the telecommunication devices of the clique is equal to the coordinated carrier aggregation capability.

11. Method according to claim 8, wherein if the coordinated carrier aggregation capability of a telecommunication device is upper than one, the method comprises further step executed by the centralizing device of duplicating the telecommunication device prior to determining the graph of neighboring telecommunication devices.

12. Method according to claim 5, wherein the at least one frequency band the telecommunication device has to use for communicating with the mobile terminal and the at least one frequency band the at least one neighboring telecommunication device has to use for transferring data between the neighboring telecommunication device and the mobile terminal or the other mobile terminal are determined using a coloring algorithm.

13. Apparatus for enabling, in a wireless cellular telecommunication network, at least one mobile terminal to communicate data through multiple frequency bands, the at least one mobile terminal being served by a telecommunication device which is able to communicate data through at least one frequency band, wherein the apparatus is included in the telecommunication device and comprises:

means for obtaining at least one mobile terminal carrier aggregation capability of the at least one mobile terminal, means for determining a coordinated carrier aggregation capability C of the telecommunication device from the at least one mobile terminal carrier aggregation capability, means for transferring the coordinated carrier aggregation capability C to a centralizing device of the wireless cellular telecommunication network, means for transferring information related to at least one neighboring telecommunication device to the centralizing device of the wireless cellular telecommunication network, means for receiving, from the centralizing device, information indicating at least one frequency band the telecommunication device has to use for communicating with the mobile terminal, means for transferring control signaling to the at least one telecommunication device through the at least one frequency band the telecommunication device has to use for communicating with the mobile terminal.

14. Centralizing device for determining which frequency bands have to be used, in a wireless cellular telecommunication network, to communicate with at least one mobile terminal, the at least one mobile terminal being served by a telecommunication device which is able to communicate with the at least one mobile terminal through at least one frequency band, wherein the centralizing device comprises:

means for receiving from the telecommunication device, a coordinated mobile terminal carrier aggregation capability C of the telecommunication device, means for receiving from the telecommunication device, information related to at least one neighboring telecommunication device of the telecommunication device, means for determining for the telecommunication device and the at least one neighboring telecommunication device, the at least one frequency band the telecommunication device has to use for communicating with the at least one mobile terminal and at least one frequency band the at least one neighboring telecommunication device has to use for communicating with the at least one mobile terminal, or another mobile terminal, means for transferring to the telecommunication device, information indicating to the telecommunication device, the at least one frequency band the telecommunication device has to use for communicating with the at least one mobile terminal.

* * * * *